Sept. 23, 1958  A. CHRISTENSEN ET AL  2,853,371
HIGH PRESSURE SYNTHESIS APPARATUS
Filed Sept. 8, 1955  4 Sheets-Sheet 2

INVENTORS.
AXEL CHRISTENSEN,
ROBERT D. RAYFIEL,
BY

ATTORNEY.

Sept. 23, 1958 A. CHRISTENSEN ET AL 2,853,371
HIGH PRESSURE SYNTHESIS APPARATUS
Filed Sept. 8, 1955 4 Sheets-Sheet 3

INVENTORS.
AXEL CHRISTENSEN
ROBERT D. RAYFIEL
BY
Wm. P. Spielman
ATTORNEY.

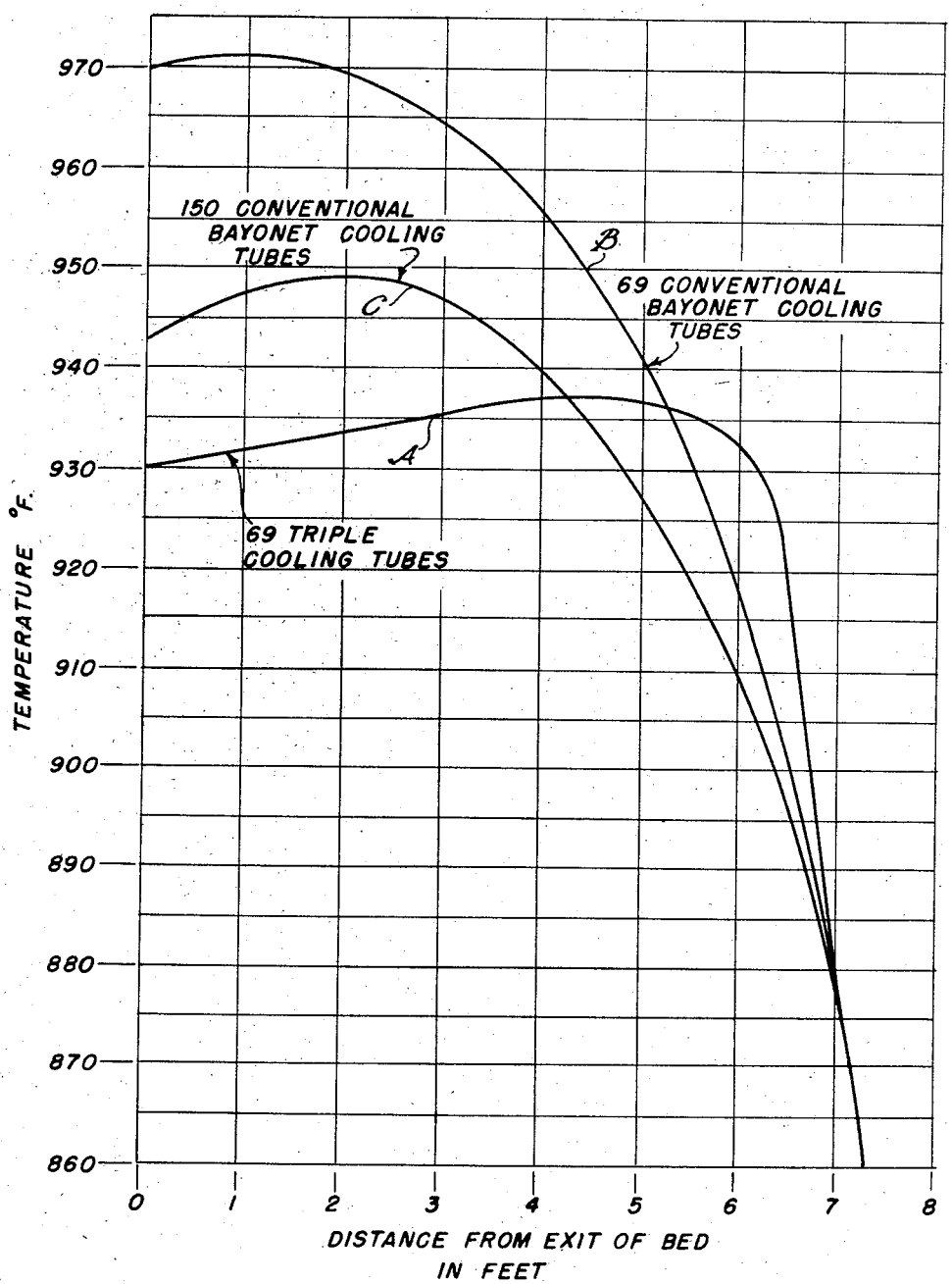

United States Patent Office 2,853,371
Patented Sept. 23, 1958

2,853,371

HIGH PRESSURE SYNTHESIS APPARATUS

Axel Christensen, Stamford, Conn., and Robert D. Rayfiel, Croton, N. Y., assignors to Chemical Construction Corporation, New York, N. Y., a corporation of Delaware Application September 8, 1955, Serial No. 533,068

3 Claims. (Cl. 23—289)

This invention relates to apparatus for carrying out exothermic vapor phase catalytic reactions wherein a gaseous reaction mixture is passed through a stationary catalyst bed. The invention is particularly adapted for use in reactions of this type that are conducted at high pressures; i. e., within the range of about 100–1000 atmospheres or higher such as the ammonia synthesis, the synthesis of methanol from carbon monoxide and hydrogen, the Fischer-Tropsch synthesis of hydrocarbons and higher alcohols, and other similar hydrogenation reactions.

In such reactions the control of temperature conditions within the catalyst is a problem of major importance. Elevated catalyst temperatures are needed to obtain a rapid reaction rate but if the temperature becomes too high in any portion of the catalyst layer the catalytic material will be damaged and its activity will decrease. It is well known, for example, that the promoted iron catalysts used in the synthesis of ammonia lose their activity rapidly at temperatures substantially above 500° C. and therefore ammonia synthesis converters must be provided with internal cooling elements capable of preventing such excessive temperatures in all parts of the catalyst bed. The same is true of the catalysts used in methanol synthesis and other hydrogenation reactions that are carried out at high pressures.

In order to maintain adequate temperature control the catalyst has up to the present been most advantageously cooled by bayonet tubes that are spaced sufficiently closely together to prevent local overheating and hot spots in the catalyst. The relatively cool incoming reaction gases pass through the core tubes of these heat exchangers in a direction countercurrent to that of the flow of reacting gases through the catalyst, then reverse their flow and pass through an annulus between the core tube and the outer tube in cocurrent flow with the reacting gases and are then passed through the catalyst itself. The present invention is directed particularly to improvements in heat exchange elements of this type and to temperature conditions within the catalyst bed that are obtained thereby.

The structure of the converters used in carrying out high pressure, high temperature vapor phase reactions has reached an advanced stage of development. Such converters consist essentially of thick and heavy pressure-sustaining walls enclosing a cartridge or reaction unit which contains the catalyst and its cooling tubes and which also usually contains a heat exchanger for preheating the incoming gases by indirect heat exchange with the hot gases leaving the catalyst. In order to insulate the converter shell from the high temperatures in the catalyst and heat exchanger the incoming gases are first passed between the outer pressure-sustaining walls and the inner cartridge or catalyst unit. They then pass into and through the heat exchanger, wherein they are partially preheated while simultaneously cooling the reacted gases from the catalyst. The incoming gases then enter the bayonet coolers embedded in the catalyst, as described above, after which they make their first contact with the catalyst itself. The hot reacted gases from the catalyst are passed directly to the tubes of the heat exchanger and after partial cooling therein they leave the converter through a suitable outlet passage in the pressure-sustaining shell thereof. In order to attain this path of travel it is essential that the gas inlet ends of the bayonet coolers embedded in the catalyst be located adjacent the internal heat exchanger in the catalyst cartridge, as otherwise the preheated reaction gases would have to travel along the pressure-sustaining shell; this would heat the metal of the shell and cause embrittlement.

High-pressure converters having the design and operation described above were developed some 25 years ago for use in the synthesis of ammonia from nitrogen-hydrogen mixtures and are described in U. S. Patent No. 1,909,378 to which reference is made for further details. Since that time a large number of such converters have been installed and operated for the ammonia synthesis, the synthesis of methanol, and for other reactions of similar type. They have given satisfactory service when operated within their designed capacities; however, experience has shown that excessively high temperatures are developed within certain parts of the catalyst under overload conditions, with a corresponding deterioration in the activity of the catalyst material.

It is a principal object of the present invention to provide a method of operation of the above-described high pressure catalytic reactions that will permit greatly increased production of the desired reaction products such as synthetic ammonia. This is accomplished by modifying the structure and operation of the bayonet coolers within the catalyst bed in such a manner that a substantially different and more efficient temperature profile is maintained within the catalyst bed, as will subsequently be explained in detail. An other important object of the invention is therefore to provide high pressure synthesis converters containing modified bayonet cooling elements that cooperate with the cooling procedures described above to permit increased converter capacity without undue rise in the catalyst temperatures. Further objects will become apparent from the following description of a preferred embodiment of the invention when taken with the appended claims.

The invention will be further described with reference to the accompanying drawings wherein:

Fig. 1 is a vertical section, with parts broken away, of the catalyst cartridge and a portion of the pressure-sustaining shell of an ammonia synthesis converter embodying the principles of the invention. It will be understood that, apart from the novel structure of bayonet heat exchange elements in the catalyst and the improved method of operation obtained thereby, the apparatus shown in this figure is that of a conventional type of ammonia synthesis converter.

Fig. 4 is a graph showing the temperature profile obtained by the process of the invention and also showing the profiles that would be obtained with conventional bayonet cooling tubes under the same operating conditions.

Figure 1:
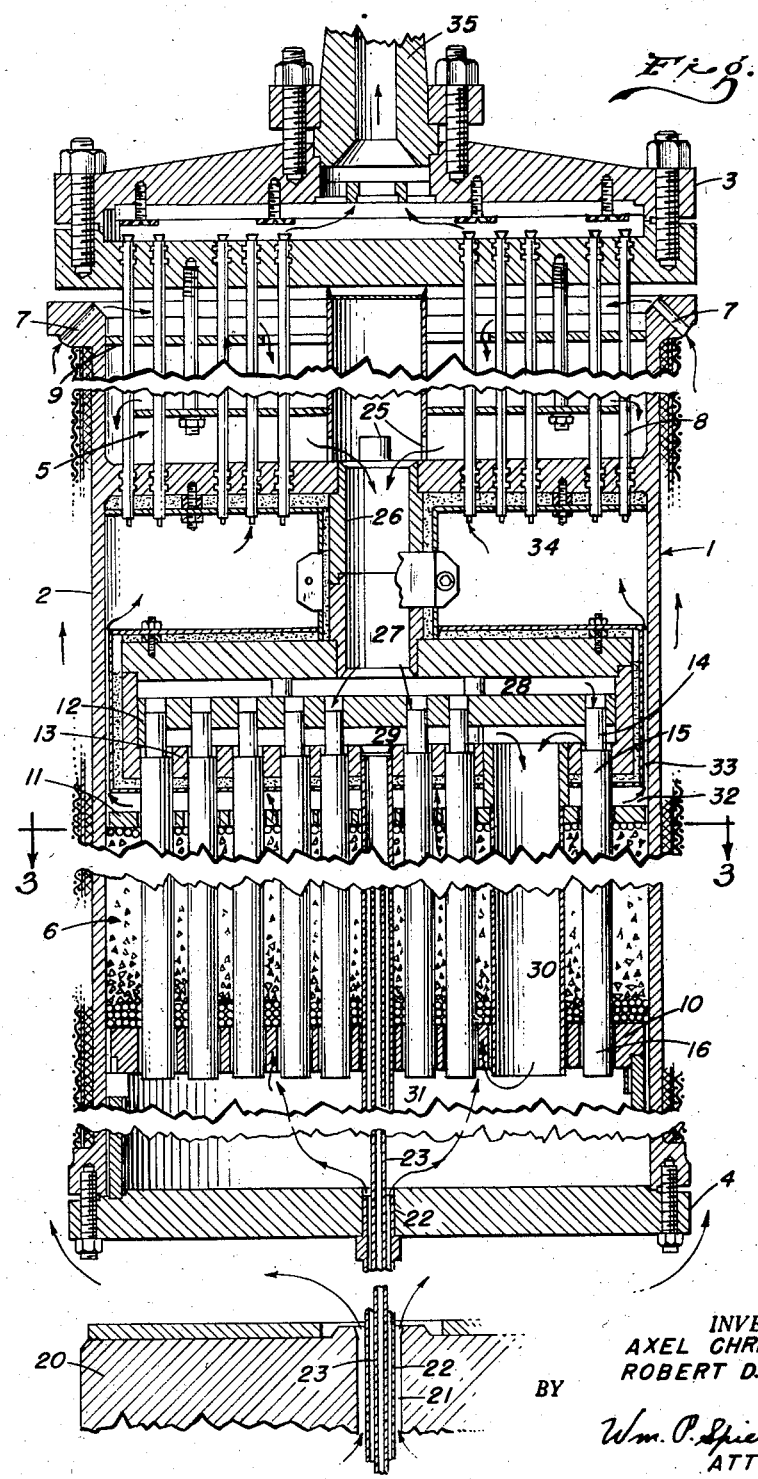

A detailed description of the converter shown on Fig. 1 of the drawings is unnecessary, as the structure and operation of such converters are well known. The catalyst cartridge indicated generally by reference numeral 1 is made up of an outer cylindrical wall or tube 2 having heads 3 and 4 bolted or otherwise attached to the opposite ends thereof. A heat exchanger 5 of conventional design is built into one end of this tube while the other end contains a catalyst basket 6. The heat exchanger 5 is provided with a series of gas inlet passages 7 around its outer end, a number of heat exchange tubes 8 extending longitudinally of the tube 2 and transverse baffles 9 for directing the flow of incoming gases across the tubes to obtain efficient heat exchange. The catalyst basket 6 is made up of a lower catalyst-retaining grid 10 and an upper grid 11, both containing openings for the passage of gases therethrough, and upper and lower tube sheets 12 and 13 in which the ends of the core tubes 14 and the outer tubes 15 of the bayonet coolers are securely fastened. The lower ends 16 of the outer tubes 15 extend through the bottom grid 10 and are held in place thereby; the lower ends 17 of the core tubes (Fig. 2) terminate some distance above the bottom grid 10 and may be held concentric with the outer tubes containing them by suitable spacers if desired. Granular catalyst material is placed in the basket 6 around all of the outer tubes 15, as indicated on Fig. 3 of the drawings, and extends in an unbroken column from the lower grid 10 to the upper grid 11.

It will be understood that the cartridge 1 is completely surrounded in the converter by heavy pressure-resisting walls. A portion of the lower or inlet head of this outer shell or bomb is indicated on the drawing by reference numeral 20 and the gas inlet channel thereon is shown at 21. Concentric tubes 22 and 23 are located in this passage; outer tube 22 is a by-pass for the admission of cold reaction gases directly to the catalyst, to assist in controlling the catalyst temperatures, and tube 23 is a thermocouple well. The main flow of reaction gases passes through the pressure-sustaining wall by means of the outer passage 21; the gases then pass outwardly and flow along the inner surface of the pressure-sustaining shell longitudinally of the cartridge 1 and finally enter this cartridge through the inlet passages 7 leading to the gas inlet side of the heat exchanger 5. The flow of these gases is indicated on the drawing by arrows. From the inlets 7 the incoming gases pass across the heat exchanger tubes 8, being guided by the baffles 9, and enter ports 25 in a centrally located passage 26. The partially preheated gases flow along this passage to its outlet 27 which communicates with the inlet ends 14 of the core tubes by means of a gas inlet passage 28. The incoming gases flow downwardly through the core tubes to their lower ends 17 and then reverse their direction of flow and pass upwardly through the annular passages between the outer surfaces of these tubes and the inner surfaces of the tubes 15 and finally enter the passage 29 between the upper and lower tube sheets 12 and 13. The gases then flow downwardly through the gas-conducting tubes 30 to the space 31 below the bottom grid 10, where they again reverse their direction and flow upwardly through the catalyst. The gases pass from the catalyst through the upper grid 11 and enter the passage 32 from which they pass through an annular channel 33 to the inlet chamber 34 of the heat exchanger 5. From this chamber the reacted gases pass through the heat exchanger tubes 8, giving up the major portion of their heat to the incoming reaction gases, and finally leave the converter through the gas outlet 35.

In converters with this type of operation the catalyst cooling elements have heretofore been designed to maintain a temperature gradient that rises continuously from the gas inlet end of the catalyst bed to an area adjacent the gas exit end thereof as shown at C on Fig. 4 of the drawings. This is done by operating the bayonet coolers as double countercurrent heat exchange units wherein the gases passing downwardly through the core tubes 14 are preheated by heat exchange with preceding portions of the same gas stream passing upwardly in the annuli between the core tubes and the outer tubes; in a typical ammonia converter having core tubes six feet long the gas may be heated by about 100°–150° F. before it comes into heat exchanging relation with the catalyst. This type of operation has resulted in good yields of ammonia, methanol or other reaction product for each passage of the reacting gases through the catalyst at the designed operating capacities, but the catalyst temperature control becomes unstable under overloads.

The present invention utilizes a modified form of bayonet cooling tubes wherein heat exchange between the incoming gases in the core tube and the outgoing gases in the annulus is substantially prevented, and attains a temperature gradient having a relatively flat profile through the main body of the catalyst instead of the gradual rise in catalyst temperatures that has heretofore been maintained. The result of this modified temperature profile is that the converter can be operated at greatly increased capacity without overheating any part of the catalyst bed to a point where the catalyst life is shortened; in other words, much greater conversion capacities are attained without shortening the catalyst life.

Figure 2:
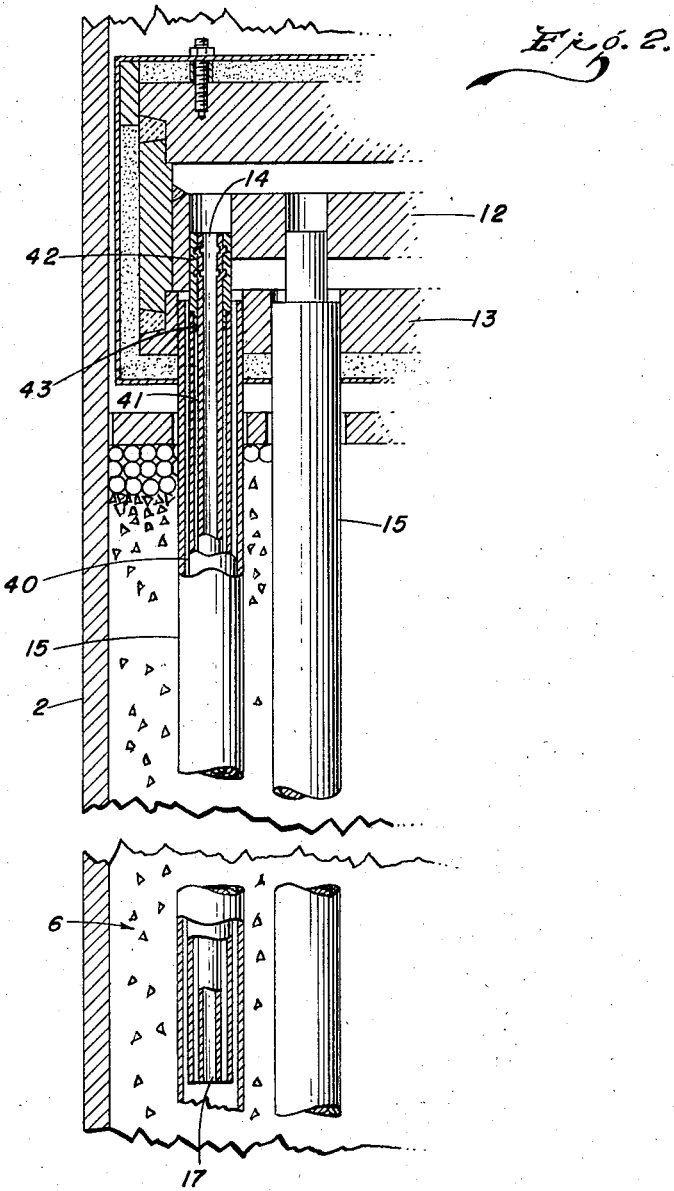
Fig. 2 is an enlarged detail of a portion of the catalyst basket of Fig. 1 showing the structure of the improved bayonet heat exchangers.

A modified construction of the bayonet cooling tubes with which this improvement can be obtained is shown on Fig. 2 of the drawings. The outer or closed-end tubes 15 mounted in lower tube sheet 13 are the same as those in the conventional structure described above. The inner or core tubes 14, however, supported in the upper tube sheet 12 are provided with suitable insulation on the exterior thereof to prevent preheating of the incoming gases while they flow downwardly therein. Although any suitable type of insulation may be used, a particular feature of the invention consists in the provision of intermediate tubes 40 surrounding the core tubes 14 and providing a stagnant gas space 41 therebetween. The provision of the tubes 40 constitutes a ready and efficient means for obtaining the desired thermal insulation of the core tubes from the outer tubes 15 without changing materially the cross sectional areas of the gas passages involved; this is important in applying the principles of the invention to converters already in existence. It will be understood that introduction of the requisite amount of insulation between the core tubes 14 and the outer tubes 15 results in a substantially isothermal temperature gradient in the gas outlet end of the catalyst bed. This is a much more stable type of operation than has previously been obtained; it prevents overheating of the catalyst even when the converter is operated at pressures and gas velocities far above those for which it was originally designed.

The particular construction utilized to install the insulating tubes 40 is evident from the drawing. The core tubes 14 are rolled into hollow cylindrical blocks 42 having longitudinal flanges 43 on their lower ends and the insulating tubes 40 are fitted around these flanges and attached thereto by welding or other suitable means. The insulating tubes are preferably coextensive in length with the core tubes 14, so that insulation is obtained throughout the full length of these tubes, but it will be understood that their length may be varied to provide a modified temperature profile in the catalyst if this should be advisable. It will thus be seen that the particular embodiment of the invention illustrated on the drawings can be installed with very little increase in the cost of the converter and can be designed to obtain any desired modification in the temperature conditions in the catalyst bed within the limitations outlined above.

On Fig. 4 of the drawings the modified temperature gradient obtained with the triple cooling tubes of Fig. 2 is shown by curve A. For purposes of comparison, a curve showing the temperature profile that would be obtained at the same production capacity with an equal number of conventional bayonet cooling tubes is shown at B and a third curve showing the much greater number of conventional tubes necessary to obtain a result comparable with that of the present invention is shown at C. In the case of curve C it will be understood that the diameter of the catalyst bed, and therefore the diameters of the catalyst basket and of the pressure-resisting shell, would have to be greatly enlarged to accommodate the extra tubes; in other words, the entire converter would have to be made much larger to obtain the increased capacity.

The greatly modified profile of the temperature gradient in the catalyst that is obtained by the present invention is evident from the drawing. The curves were obtained by plotting the temperature of the catalyst, in degrees Fahrenheit, against the distance from the exit of the catalyst bed, expressed in feet. It will be seen that in all cases the nitrogen-hydrogen gas mixture was preheated by the heat exchanger 5 and by the bayonet cooling tubes to 860° F., and that its temperature rose sharply to 920°–930° F. in the first foot of catalyst below the level of the lower ends 17 of the core tubes 14. From this point the effect of the insulation is apparent; the cooling action of the partially preheated incoming gases, obtained by the conventional bayonet cooling tubes, is much less than that obtained with the triple cooling tubes of the present invention and therefore there is a continuous increase in the catalyst temperatures both in curve B and in curve C. Curve A, on the other hand, shows that with the improvement of the present invention the catalyst temperatures remain almost constant throughout the remainder of the catalyst bed, and at no time is the catalytic material in any danger of damage by excessively high temperatures.

The invention has been described with particular reference to the synthesis of ammonia from nitrogen and hydrogen since this is a typical high pressure exothermic vapor phase reaction that is in wide commercial use. It will be understood, however, that comparable advantages are obtainable in similar converters operated for the synthesis of methanol or the synthesis of hydrocarbons from carbon monoxide and hydrogen or carbon dioxide and hydrogen and in other strongly exothermic high temperature catalytic reactions that are carried out at high pressures. Although the principles of the invention can also be applied to low-pressure exothermic reactions if desired they are not of comparable importance, for the degree of heat exchange obtained with uninsulated core tubes at operating pressurese substantially below 100 atmospheres is relatively low at lower pressures and does not ordinarliy warrant the use of insulation.

*Example*

Figure 3:
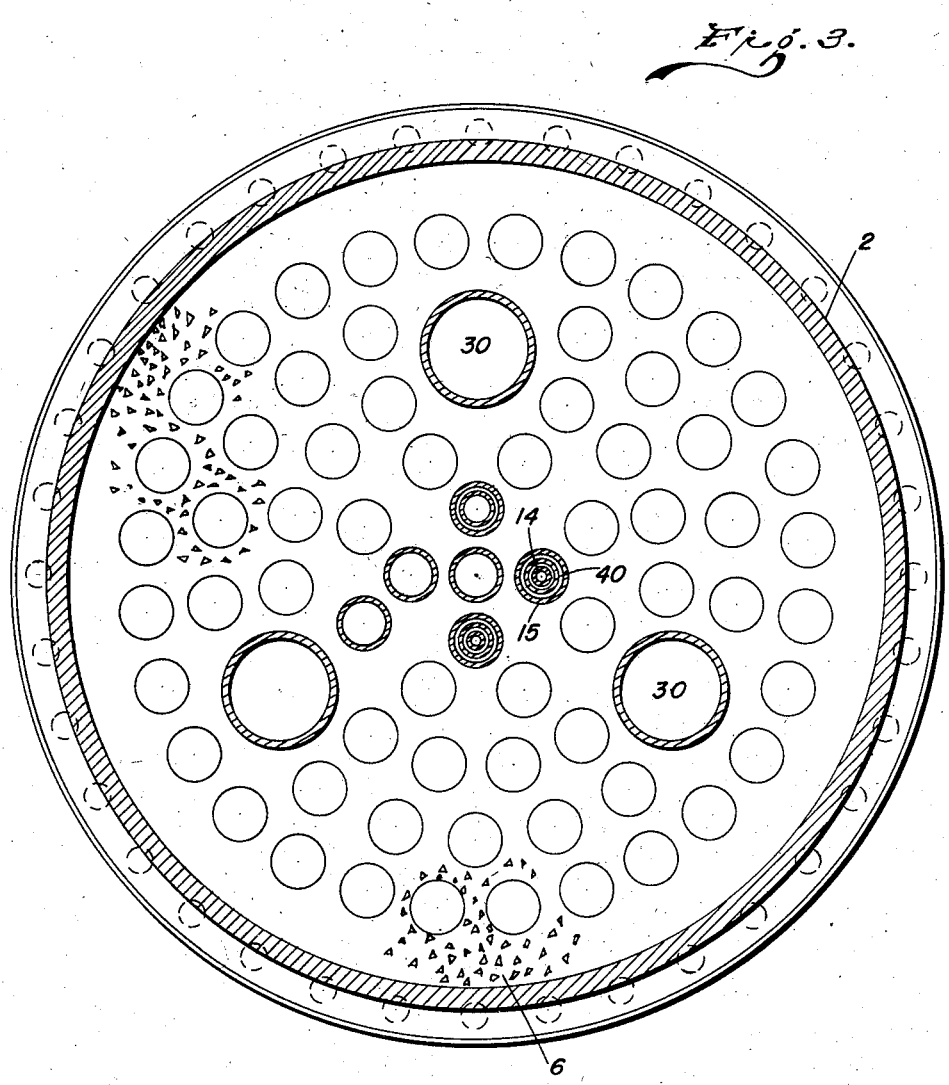
Fig. 3 is a horizontal section on the line 3—3 of Fig. 1 showing the location of the bayonet coolers throughout the catalyst and also the gas-conducting tubes.

The converter shown on Figs. 1 to 3 of the drawings was operated at 1000 atmospheres' pressure and space velocities of about 90,000 for the production of 42–43 tons of ammonia per 24 hour day using a synthesis gas containing about 68% by volume of a 1:3 nitrogen-hydrogen mixture and 30–32% of inert gases which were principally methane and argon. The catalyst bed was 7.3 feet long and 17 inches in diameter; the outer cooling tubes 15 were one inch in outside diameter and the catalyst volume was therefore 7.4 cubic feet.

Inlet gas temperatures at the core tubes 14 were maintained at 630° F. and the catalyst temperatures were 860°–935° F. as shown on Fig. 4 of the drawings. The lower ends 17 of the core tubes 14 were about one foot from the closed ends of the outer tubes 15 and therefore the temperature rise in the catalyst was checked at this level by the cooling action of the heat exchange tubes. The drawing shows that a very stable operation was obtained throughout the remainder of the catalyst bed, the temperature gradient being a flat curve that slopes downwardly toward the exit end of the converter with the decrease of unreacted nitrogen and hydrogen in the gases.

The temperatures shown on curve A were obtained with thermo-couples in the well 23 at the axis of the catalyst. It will be understood that these temperatures can be lowered or raised by varying the inlet temperature of the gases entering the core tubes 14 without essential modification in the character of the curve itself; in other words the invention permits operation of the catalyst at any desired temperature level with a substantially flat temperature gradient longitudinally of the catalyst, which is a very stable type of operation.

Curves B and C are calculated temperature profiles for the same converter and gas inlet temperatures using conventional bayonet heat exchangers instead of the insulated core tubes of the present invention. Curve B shows that much higher catalyst exit temperatures would be obtained with the same number of tubes and curve C shows the operating conditions if a larger number of tubes were used to maintain comparable exit temperatures. It will be seen that in both cases a much less stable operation is obtained since there is a maximum in the temperature profile near the exit of the catalyst bed.

What we claim is:

1. Apparatus for conducting exothermic vapor phase catalytic reactions at high pressures comprising in combination a heavy pressure resistant converter shell, a catalyst basket within said shell and a bed of catalyst in said basket having a number of spaced bayonet cooling elements embedded therein and extending parallel to the flow of reaction gases therethrough, said cooling elements comprising outer tubes in heat exchanging relation with the catalyst, core tubes within but spaced from said outer tubes and thermal insulation means between said core tubes and said outer tubes, and means for passing incoming reaction gases through said core tubes, then through said outer tubes in the opposite direction, then through and in contact with the catalyst in the same direction as that of their flow through said other tubes, and then through said heat exchanger in indirect heat exchange with said incoming reaction gates.

2. Apparatus for conducting exothermic vapor phase catalytic reactions at high pressures comprising in combination a heavy pressure resistant converter shell, a catalyst cartridge within said shell containing a heat exchanger at one end thereof and a catalyst basket at the opposite end, a bed of catalyst in said basket having a number of spaced bayonet cooling elements embedded therein and extending parallel to the flow of reaction gases therethrough, said cooling elements comprising outer tubes in heat exchanging relation with the catalyst, central core tubes within but spaced from said outer tubes and insulating tubes between said core tubes and said outer tubes and separated from said core tubes to provide stagnant gas insulation therebetween, and means for passing incoming reaction gases through said heat exchanger, then through said core tubes, then through said outer tubes in the opposite direction, then through and in contact with the catalyst in the same direction as that of their flow through said outer tubes, and then through said heat exchanger in indirect heat exchange with said incoming reaction gases.

3. Apparatus according to claim 2 wherein each core tube is attached at its end to the inner surface of a hollow block having a longitudinal flange to which the insulating tube is fastened and the blocks are carried by a tube sheet extending across the catalyst cartridge.

References Cited in the file of this patent

UNITED STATES PATENTS

| | | |
|---|---|---|
| 1,707,417 | Richardson | Apr. 2, 1929 |
| 1,909,378 | Richardson | May 16, 1933 |

UNITED STATES PATENT OFFICE
CERTIFICATE OF CORRECTION

Patent No. 2,853,371 September 23, 1958

Axel Christensen et al.

It is hereby certified that error appears in the printed specification of the above numbered patent requiring correction and that the said Letters Patent should read as corrected below.

Column 6, line 34, for "other" read -- outer --; line 36, for "gates" read -- gases --.

Signed and sealed this 25th day of November 1958.

(SEAL)
Attest:

KARL H. AXLINE
Attesting Officer

ROBERT C. WATSON
Commissioner of Patents